June 27, 1939.　　　K. CLARK　　　2,164,187

POWER LIGHTING SYSTEM

Filed Oct. 12, 1936　　　3 Sheets-Sheet 1

INVENTOR
Kendall Clark
BY A.E.Wilson
ATTORNEY

June 27, 1939.　　　　K. CLARK　　　　2,164,187
POWER LIGHTING SYSTEM
Filed Oct. 12, 1936　　　　3 Sheets-Sheet 2
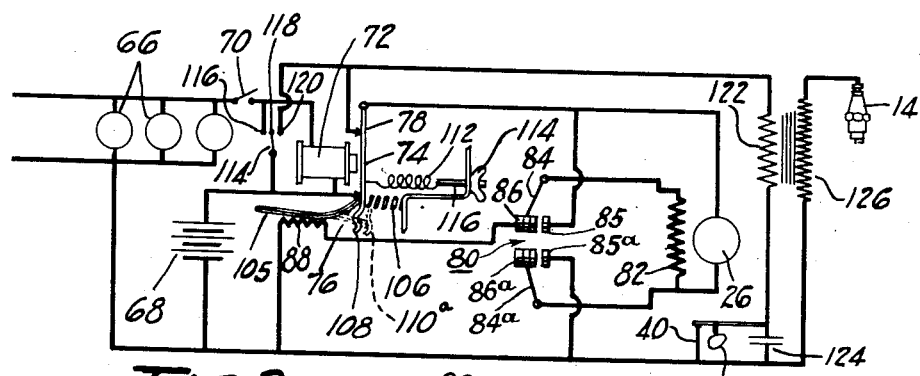
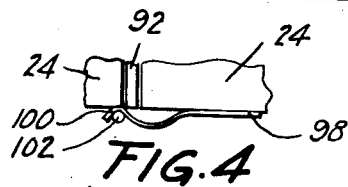
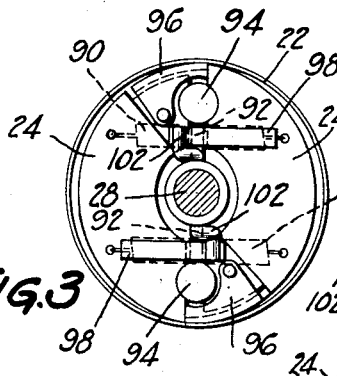
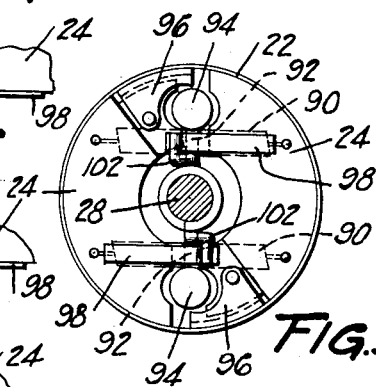
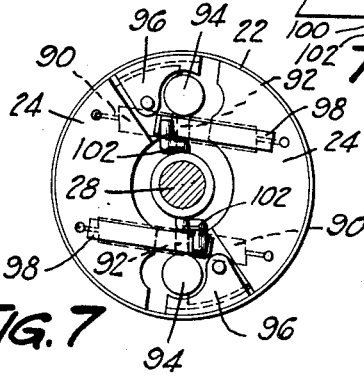
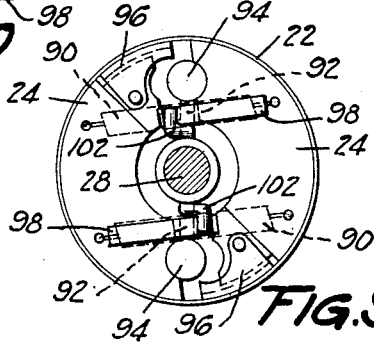
INVENTOR
Kendall Clark
BY *A. E. Wilson*
ATTORNEY June 27, 1939. K. CLARK 2,164,187
POWER LIGHTING SYSTEM
Filed Oct. 12, 1936 3 Sheets-Sheet 3
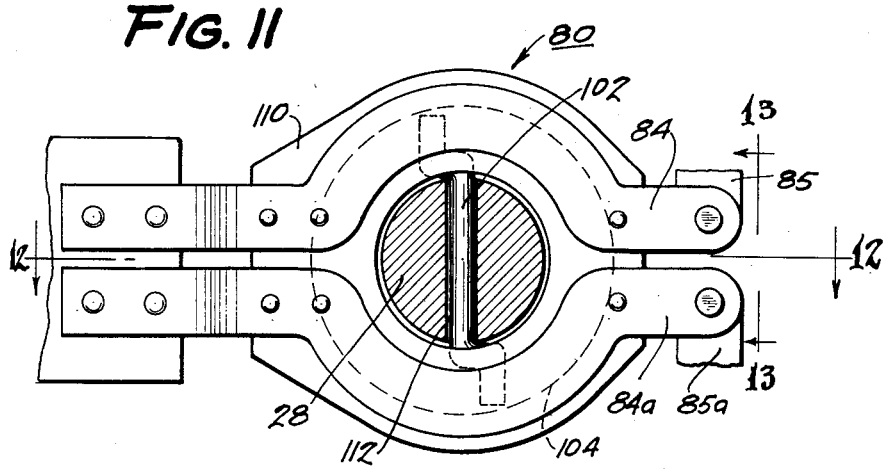
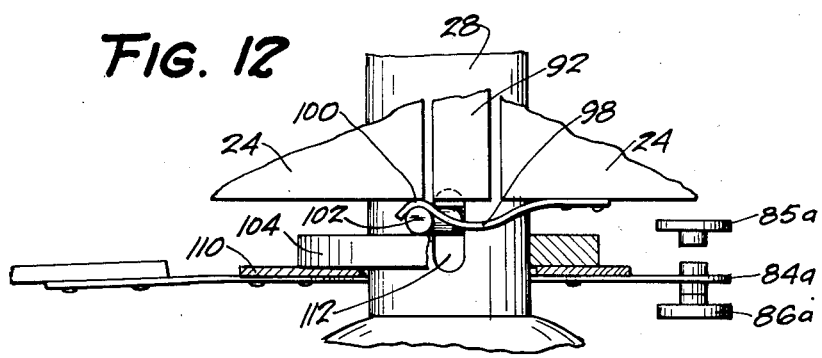
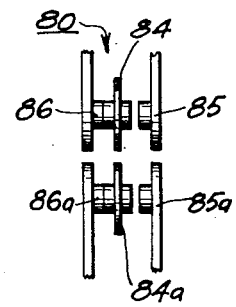
INVENTOR.
Kendall Clark
BY A. E. Wilson
ATTORNEY.

Patented June 27, 1939

2,164,187

UNITED STATES PATENT OFFICE 2,164,187

POWER LIGHTING SYSTEM

Kendall Clark, South Bend, Ind.

Application October 12, 1936, Serial No. 105,191

5 Claims. (Cl. 290—31)

The present invention relates to an electric generating plant, and more particularly to a small portable unit which may be employed in a large number of installations.

The device consists of an electric generator driven by an internal combustion engine, together with suitable accessories sufficient to make the operations of starting and stopping fully automatic in accordance with the electric current demands made upon the electric generating plant.

In ordinary generating plants of this classification the generator has an additional winding incorporated in it that allows the generator also to function as a high torque electric motor for the purpose of starting the internal combustion engine. Furthermore, the generator is at all times rigidly coupled to the engine. The additional winding, commonly known as the starting winding, increases the size and weight of the generator, and also materially increases its cost. To start this type of generating plant, the starting winding is connected to a storage battery either by a manually operated switch or by an electrically operated relay. The generator then operates for a short period as an electric motor for the purpose of starting the internal combustion engine. As soon as the engine has started and is delivering sufficient power to drive the generator, the starting winding is disconnected from the battery, either manually or by an electrically operated relay, and the generator functions in a normal manner to generate electric current.

An object of this invention is to provide an economical power plant which may be driven by a light-weight internal combustion engine.

A further object is to provide a light-weight power plant having automatically operable means to start and stop the prime mover which drives the power plant.

Another object of this invention is to provide a simplified power plant wherein a novel arrangement is made, whereby an electric generator without a starting winding is employed, in combination with a centrifugally operated clutch, for the purpose of starting the internal combustion engine.

A further object is to provide a power plant wherein the starting winding may be eliminated and a low cost standard production generator used. The starting torque of a standard generator operating as an electric motor is insufficient to start the engine directly, but by using the described method, starting is readily accomplished.

Yet a further object is to provide a centrifugally operated clutch on the generator shaft, interposed between the generator and the internal combustion engine to start the engine using the rotational kinetic energy of the generator armature. In one desirable embodiment of the invention the clutch is arranged automatically to connect or disconnect the generator to the gasoline engine as the rotational speed of the generator armature rises above, or falls below, the critical speed for which the clutch is adjusted.

A still further object of the invention is to provide means whereby the generating plant may be started by connecting the generator to the battery either automatically or manually by an electrically operated relay or switch which changes the generator connections in a manner such that the generator operates as a series wound motor to rotate in the proper direction. Another desirable feature of the invention resides in the fact that during the first part of the starting phase, the centrifugally operated clutch is disengaged, and the generator, operating as a motor rotates rapidly up to the speed at which the centrifugally operated clutch interconnects the generator armature and the internal combustion engine. In this embodiment of the invention the rotational inertia of the generator armature starts the engine by rotating its crankshaft.

Another object of the invention is to provide means for recycling should the engine not start at the first attempt. As the generator armature loses its rotational speed and slows down to a predetermined speed, the centrifugally operated clutch disengages the generator from the engine. The armature then again picks up speed, and the cycle is repeated until the engine starts.

A further object is to provide means operable to interrupt the starting operation to prevent the battery from becoming totally discharged in the event that the prime mover fails to start after several attempts.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings, wherein similar reference characters refer to similar parts throughout the several views:

Figure 2 is a diagram showing the electrical connections of the device;

Figure 3 is a vertical sectional view taken substantially in the plane indicated by the line 2—2 on Figure 1;

Figure 4 is a fragmental sectional view taken substantially in the plane indicated by the line 4—4 on Figure 3;

Figure 1:
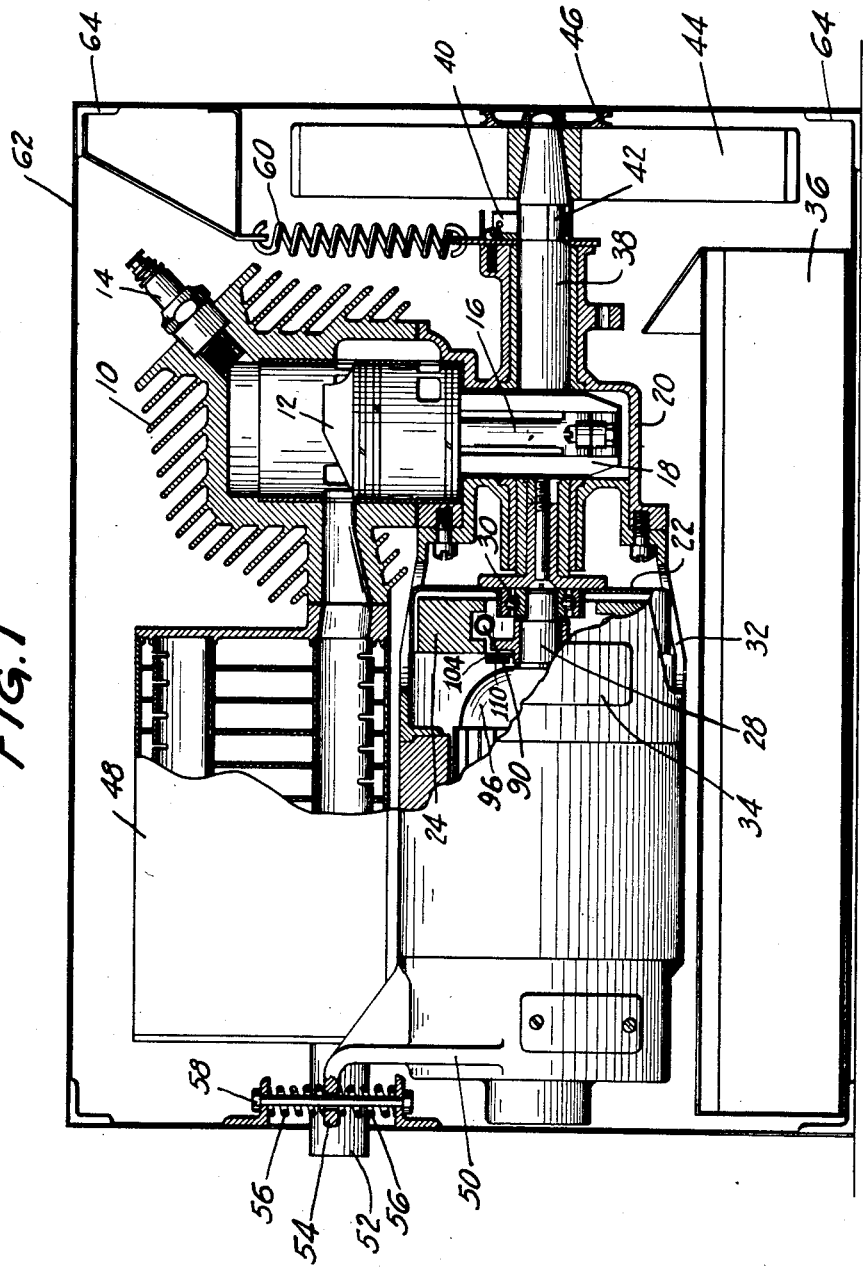
Figure 1 is an elevational view of a device embodying the present invention.

Figures 5 and 6, 7 and 8, 9 and 10 are views similar to Figures 3 and 4, showing the progressive operation of the clutch from the starting to running condition;

Figure 11 is a sectional view, in elevation, of the clutch operated change-over switch;

Figure 12 is a horizontal sectional view taken substantially in the plane indicated by the line 12—12 of Figure 11; and Figure 13 is an end elevational view taken substantially as indicated by the line 13—13 of Figure 11.

The form of the invention illustrated includes an internal combustion engine shown in Figure 1, consisting of an air-cooled cylinder 10 with a suitable piston 12 and spark plug 14 operating therein. The piston 12 is actuated by a connecting rod 16 connected to a crankshaft 18 positioned in the crankcase 20. The crankshaft 18 is connected to a cylindrical drum 22 of a centrifugally operated clutch. The generator shaft drives the clutch members 24.

A generator armature 26 and an armature shaft 28 are also connected to the centrifugally operated clutch members 24. An anti-friction bearing 30 serves to support the armature shaft adjacent to the crankshaft and at the same time allows the armature shaft to rotate freely and independently of the crankshaft. The stator and field coils of the generator are supported from the crankcase 20 by frame member 32. A covered switch box 34 houses an electrical clutch-operating switch 80 that changes the electric generator connections to those of an electric motor for starting purposes, and back again to those of an electric generator for generating purposes.

As best shown in Figures 11, 12 and 13, the change-over switch 80 comprises a pair of spring blade contacts 84 and 84a mounted so as to be urged into engagement with a pair of contacts 85 and 85a respectively, when permitted by a cam follower 100 to be hereinafter described in more detail. Switch blades 84 and 84a are secured to and reinforced with an insulating block 110 engaging a thrust plate 104 slidably mounted upon the shaft 28 and held in engagement by the spring blades 84 and 84a with a thrust bar 102 slidably mounted in a slot 112 in the shaft 28 for longitudinal movement thereof to actuate change-over switch 80.

As shown in Figure 13, the contact points 84 and 84a are forced into engagement with the contacts 86 and 86a respectively for the starting position, in which the generator serves as a motor to crank the internal combustion engine. Contact 86a is not connected to form a part of the circuit but merely functions to balance the thrust of plate 104 and pin 102 against the spring blades 84 and 84a.

A fuel tank 36 is located below the engine and is connected to a carburetor. The carburetor is connected to the hollow ported crankshaft 38 through which the gasoline mixture is drawn into the crankcase 20 during the outward strokes of the piston 12. Ignition breaker points 40 are operated by a cam 42 on the crankshaft 38. A fan 44 driven by the crankshaft 38, serves to cool both the internal combustion engine and the generator. An auxiliary rope starting device 46 may be employed to start the engine.

A muffler 48 may be connected to the exhaust port of the engine at one end, and to the commutator frame end of the generator 50 at the other end, and discharges through the pipe 52.

An extension 54 of the commutator end frame of the generator 50 rests on a resilient supporting member 56 and is held in alinement by a bolt 58. The front end of the generating unit is supported by a resilient member 60. The entire device may be enclosed within a housing 62 supported on frame 64.

In the operation of this power lighting system, when an external electrical load, such as an electric light 66 (Figure 2), is connected to a battery 68 by the closing of a switch 70, the current flows from the battery 68 through a relay magnet 72 and thence through the switch 70 to the electrical load 66. The relay magnet 72 pulls on the armature 74, to close the electrical contacts 76 and 78.

A clutch-operated switch 80 is normally in the position shown when the generator is at rest or when the generator is operating as a motor. With the switch 80 in the position illustrated, the current from the battery 68 passes through the relay contact 76 to the relay armature 74, and thence to the generator armature 26. From the generator armature 26 it passes through the generator field coil 82 to the switch blade 84, and finally through a switch contact 86 and a resistance heating unit 88 to the battery 68.

With the switch 80 in the position shown, the generator is connected to operate as a series wound electric motor. The current flowing through the generator under these conditions will cause the generator armature to accelerate rapidly up to a speed at which the centrifugally operated clutch engages the engine crankshaft 18.

The centrifugally operated clutch is shown in the disengaged position in Figure 3. The clutch itself consists of the clutch members 24, which are maintained in a disengaged position from the clutch drum 22 by the springs 90. The normal direction of rotation of the clutch is counter-clockwise. The clutch is driven by the armature shaft 28 during the starting phase, through the medium of a torque bar 92 and the driving pins 94. The heel or trailing end of each clutch shoe member 24 has attached to it a small auxiliary shoe 96 intended to prevent the engine from over-running the generator in the event that the engine should start after the clutch disengages the armature from the engine. Each clutch shoe member 24 also has attached to it a small curved spring 98 (see also Figure 4). A curve 100 in the spring 98 acts in the manner of a cam follower for the purpose of actuating the generator change-over switch 80, in accordance with the position of the clutch. The spring or cam follower 100 is actuated by the surface of the adjacent clutch member 24 or the front face of the torque bar 92. A small thrust bar 102 lies in the hollow of the curve 100 of the springs 98, and serves to transmit the axial motion of the cam-operating springs 98 to a thrust plate 104. The thrust plate 104 in turn serves to actuate the switch 80 from the starting to the running position and back again in accordance with the direction of the drive through the clutch.

Figure 5 shows the centrifugally operated clutch in the position it occupies when the centrifugal force on the clutch members 24 has just overcome the tension of the springs 90 and allowed the clutch members 24 to come into contact with the clutch drum 22.

Figure 6 shows the position of the cam follower 100 and associated parts corresponding to the position of the clutch members shown in Figure 5.

Figure 7 shows the position of the clutch members 24 an instant after they have become engaged with the clutch drum 22. The friction of the clutch members 24 against the stationary clutch drum 22 has retarded the movement of the clutch members 24 to the point at which they come into engagement with the driving pins 94. The friction of the clutch members 24 against the drum 22 is sufficient to engage the two units together, thereby coupling the generator armature shaft 28 to the crankshaft 18. The kinetic energy stored in the armature is sufficient to rotate the crankshaft of the internal combustion engine to start the engine.

Figure 8 shows the position of the cam follower 100 and its associated parts corresponding to the position shown in Figure 7. It will be noted that the thrust bar 102 is in the same axial position that it was under the position shown in Figure 3.

Figure 9 shows the relative position of the clutch members 24 to the driving pins 94 when the direction of the torque through the clutch has been reversed, corresponding to the condition of the internal combustion engine driving the generator. The clutch drum 22 is now driving the clutch members 24, and forces them against the drive pins 94, thereby transmitting the torque from the engine to the armature shaft 28.

Figure 10 shows the position of the cam follower 100 corresponding to the position of the clutch members shown in Figure 9. It will be noted that the cam follower 100 rests in the hollow between the torque bar 92 and the clutch member 24. In this position the thrust bar 102 is moved axially away from the generator, thereby throwing the switch blades 84 and 84a from the starting position shown in Figure 2 to the running position, in which the switch blades 84 and 84a make with contact points 85 and 85a respectively, thus giving a parallel hookup with respect to the field coil 82 and battery 68.

With the switch 80 in the position described, i. e., with the switch blades 84 and 84a moved to the right into engagement with the contacts 85 and 85a, the generator is reconnected as an electric generator and delivers electric current to the external electric load 66 and the battery 68 because of the substantial R. P. M. increase due to the influence of the internal combustion engine.

Should the internal combustion engine fail to start at the first attempt, the centrifugally operated clutch automatically disengages the generator—which is operating as a motor—from the engine after the armature speed has slowed down considerably. As soon as the generator armature is disengaged from the engine shaft 18, the armature 26—still operating as a motor—again accelerates up to the point at which the centrifugally operated clutch re-engages the engine crankshaft, and the starting cycle is repeated.

Should the engine fail to start after several attempts, the heating resistance 88 heats the bi-metal element 105 which causes it to bend and to act against the relay armature 74 and loading spring 106. Eventually the bi-metal element 105 forces the armature 74 away from the contacts 76 and 78. The bi-metal element then becomes locked in the hook 108 of the relay armature 74, thereby holding it in the permanently disengaged position shown by the dotted lines 110ª. With the armature 74 locked out by the bi-metal strip 105, the current supply to both the generator and the engine ignition circuit is interrupted to prevent the battery 68 from becoming totally discharged. The relay will remain in the locked-out position until it is reset manually.

Under certain conditions it is desirable to prevent the generating plant from starting when small current demands are made upon it. The desired effect is accomplished by means of a resilient tension member 112 attached to the armature 74. A wing nut 114 operating on a screw 116 varies the tension in the member 112. As the pull on the relay armature 74 from the relay magnet 72 is approximately proportional to the current flowing through the magnet, the tension in the resilient member 112 can be adjusted to allow the unit to start at any predetermined electrical load.

A current demand in excess of that for which the resilient member 112 is set will ovecome the thrust of member 112 and allow the relay armature to function in the previously described manner.

As soon the current demand on the system from the electrical load 66 falls below the predetermined value of the relay adjustment, the relay armature 74 is pulled away from the relay magnet 72 by the resilient tension member 112, thereby opening the relay contact 78 to the engine ignition and stopping the generating unit by stopping the engine.

The above paragraphs describe the normal operation of the device. However, there are two auxiliary conditions of operation that must be provided for. The first auxiliary condition is the provision of a means for manually starting the engine in the event that the battery has become accidentally discharged to a point at which it has insufficient current to start the device in a normal manner. The second auxiliary condition is a means for making a direct electrical connection between the external electrical load such as the lights 66 and the battery 68 without the necessity of operating the generating plant. The three-point switch 114 is provided to take care of the above mentioned auxiliary conditions.

To start the generating plant manually, the switch 114 is moved by the operator to the contact point 120. The current from the battery 68 then flows through the switch 114, and contact 120 to the primary winding of the ignition coil 122. The circuit is completed through the ignition interrupter points 40. The remainder of the ignition device, consisting of the interrupter cam 42, ignition condenser 124, secondary ignition coil 126, and spark plug 14, functions in a normal manner. The engine may be started by means of a starting cord or rope wound around the pulley 46 in a manner similar to that of starting small engines for outboard motors.

To operate a lighting load directly from the battery without starting the generating unit, the switch 114 is moved by the operator to the contact 116. The switch 114 in this position directly short-circuits the relay coil 72 and thereby prevents the relay from starting the generating unit when the electrical load 66 is connected through the switch 70 to the battery 68. For normal automatic operation the switch 114 is returned to the open switch point 118.

It is understood that many changes may be made, and numerous details of construction may be varied through a wide range without departing from the spirit of this invention, and it is therefore not intended to limit the scope of this invention otherwise than necessitated by the prior art.

I claim:

1. A portable electric generating plant comprising a generator having an armature and electrical connections to permit it to function as a motor or as a generator, an internal combustion engine having a crankshaft, means including a centrifugally operated clutch interposed between the armature and the crankshaft to start the engine, said means employing the kinetic energy of the armature, means to start the generator armature in motion as an electric motor, automatic means to repeat the starting cycle and a clutch operated switch to actuate said connections to permit the generator to function as an electric generator when the engine is operating above a predetermined speed and as an electric motor when the engine is operating below said predetermined speed.

2. In an electric generating plant comprising a generator having an armature and electrical connections to permit it to operate as an electric generator or as an electric motor, an internal combustion engine having a crankshaft, a clutch interposed between the generator and the engine crankshaft and arranged to employ the rotational kinetic energy of the generator armature to start the engine, means to start the generator armature in motion, automatically operable means to repeat the starting cycle, means to limit the total number of starting cycles effected in a predetermined time interval, and a clutch operated switch to actuate said electrical connections to cause the generator to operate as a motor when operating below a predetermined speed and as a generator when operating above a predetermined speed.

3. A self-contained portable electric generating unit comprising a gasoline engine having a crankshaft, a generator, a centrifugally operated clutch between the armature of the generator and the crankshaft of the engine, said clutch being adapted to couple the rotating generator armature shaft to the engine crankshaft at a selected speed of the generator armature and to disengage the generator armature shaft from the engine crankshaft at a predetermined second and slower speed of the generator armature and also adapted to prevent the engine crankshaft from overrunning the generator armature shaft and a switch operated by the clutch to change the electrical connections of the generator to permit it to function either as an electric generator or as an electric motor.

4. An apparatus of the type described for generating electric current, comprising a gasoline engine, a generator having connections, a centrifugally operated clutch between the engine and the generator, a clutch operated switch for changing the connections of the electric generator to permit the generator to operate as a motor to drive the engine when the rotational speed of the generator is reduced to a predetermined speed and back again as a generator when the speed of the generator is increased to a predetermined speed, a supporting frame for the unit, and manual means for starting the engine.

5. In a generating system of the type described a generator having connections, a clutch comprising a drum, a multiplicity of centrifugally actuated frictional clutch members for engaging the drum, a multiplicity of resilient tension members restraining the frictional clutch members against the centrifugal force, an auxiliary clutch friction member constantly engaging the clutch drum to permit relative rotational motion between the clutch members and the clutch drum in one direction only, a clutch switch and means connected with the clutch to actuate the switch to change the connections of the electric generator to permit it to operate as an electric motor.

KENDALL CLARK.